US011725798B2

(12) United States Patent
Ge et al.

(10) Patent No.: US 11,725,798 B2
(45) Date of Patent: Aug. 15, 2023

(54) PROJECTION LAMP FOR PROJECTING A NEBULA AND A STARRY SKY

(71) Applicant: Xiamen Longstar Lighting Co., Ltd., Fujian (CN)

(72) Inventors: Dongwei Ge, Fujian (CN); Yinbo Wang, Fujian (CN)

(73) Assignee: Xiamen Longstar Lighting Co., Ltd., Fujian (CN)

( * ) Notice: Subject to any disclaimer, the term of this patent is extended or adjusted under 35 U.S.C. 154(b) by 96 days.

(21) Appl. No.: 17/507,887

(22) Filed: Oct. 22, 2021

(65) Prior Publication Data

US 2022/0381412 A1    Dec. 1, 2022

(30) Foreign Application Priority Data

May 28, 2021    (JP) .......................... 202121184135.X

(51) Int. Cl.
| | |
|---|---|
| *F21V 3/04* | (2018.01) |
| *G03B 21/14* | (2006.01) |
| *G03B 21/43* | (2006.01) |
| *G03B 29/00* | (2021.01) |

(52) U.S. Cl.
CPC ............ *F21V 3/049* (2013.01); *G03B 21/145* (2013.01); *G03B 21/43* (2013.01); *G03B 29/00* (2013.01)

(58) Field of Classification Search
None
See application file for complete search history.

(56) References Cited

U.S. PATENT DOCUMENTS

2021/0164628 A1* 6/2021 Zheng ...................... F21V 5/02

* cited by examiner

*Primary Examiner* — Bao-Luan Q Le
*Assistant Examiner* — Danell L Owens
(74) *Attorney, Agent, or Firm* — Cooper Legal Group, LLC

(57) ABSTRACT

The present disclosure discloses a projection lamp for projecting a nebula and a starry sky comprising a housing, a light source assembly, a laser assembly, a rotating assembly, a control board, a base seat, and a power source port. The light source assembly and the laser assembly are disposed in the housing and penetrate through the housing, and the rotating assembly and the control board are disposed in the housing. The rotating assembly is configured to drive a rotating optical sheet and a diffraction sheet to rotate. The light source assembly comprises a light source board, a light reflecting cup, a fixed optical sheet, the rotating optical sheet, and a lens assembly. The light source board, the light reflecting cup, the fixed optical sheet, the rotating optical sheet, and the lens assembly are successively disposed along a path in which light rays emitted by the light source board move.

10 Claims, 7 Drawing Sheets

PROJECTION LAMP FOR PROJECTING A NEBULA AND A STARRY SKY

RELATED APPLICATIONS

This application claims priority to Chinese patent application number 202121184135.X, filed on May 28, 2021. Chinese patent application number 202121184135.X is incorporated herein by reference.

FIELD OF THE DISCLOSURE

The present disclosure relates to a field of projection lamps, and in particular to a starry sky projection lamp.

BACKGROUND OF THE DISCLOSURE

At present, projection devices have long been constrained in form and the function of projection devices is relatively simple. With the development of society, people have higher and higher requirements for art and the beautification of the surrounding living environment. However, due to the fast pace of life and full schedule of modern people, people do not have much time to enjoy the beautiful starry sky of nature in the wild. Due to factors such as weather and living environment, people have fewer opportunities to watch the starry sky, or even the galaxy in the starry sky, and it is not convenient. In order to meet people's requirements, some projection lamps for projecting a starry sky have also appeared on the market. Projection technology is used to project the cosmic starry sky and other patterns on the roof or wall of the home, and the bright starry sky can be seen through the projection projected by projection lamps.

The existing projection lamps have the following shortcomings:

1. The existing projection lamps project stationary starry sky images, which cannot simulate the movement of actual stars and nebula.
2. The existing projection method of the projection lamps is to realize the projection pattern by hollowing out the lampshade, and it is impossible to simulate the real nebula.
3. A projection direction of the existing projection lamps cannot be adjusted.

BRIEF SUMMARY OF THE DISCLOSURE

The present disclosure provides a projection lamp for projecting a nebula and a starry sky, and the projection lamp has two independent functions of projecting the nebula and the starry sky.

In order to solve the technical problem, a first technical solution of the present disclosure is as follows.

A projection lamp for projecting a nebula and a starry sky comprises a housing, a light source assembly, a laser assembly, a rotating assembly, a control board, a base seat, and a power source port. The light source assembly and the laser assembly are disposed in the housing and penetrate through the housing, and the rotating assembly and the control board are disposed in the housing. The rotating assembly is configured to drive a rotating optical sheet of the light source assembly and a diffraction sheet to rotate, and the base seat is fixedly disposed in the housing. The power source port is disposed on the control board and penetrates through the housing, and the light source assembly comprises a light source board, a light reflecting cup, a fixed optical sheet, the rotating optical sheet, and a lens assembly. The light source board is fixedly disposed in the housing, and the light source board, the light reflecting cup, the fixed optical sheet, the rotating optical sheet, and the lens assembly are successively disposed along a path in which light rays emitted by the light source board move. The fixed optical sheet is fixedly disposed on the base seat, the rotating optical sheet is rotatably connected to the rotating assembly, and the lens assembly is fixedly disposed on the housing. The light reflecting cup is configured to reduce a lighting angle of the light rays emitted by the light source board so as to enable the light rays emitted by the light source board to be projected onto the fixed optical sheet. The fixed optical sheet and the rotating optical sheet are configured to successively scatter the light rays emitted by the light source board so as to enable the light rays scattered by the rotating optical sheet to be projected onto a projection plane to form a projection of the nebula through the lens assembly. The rotating assembly is configured to drive the rotating optical sheet to rotate so as to make the projection of the nebula flow.

In a preferred embodiment, the housing comprises an upper housing and a lower housing, and the upper housing and the lower housing are connected to each other to define a chamber.

In a preferred embodiment, the fixed optical sheet and the rotating optical sheet are frosted glass.

In a preferred embodiment, the laser assembly comprises a laser emitter and a heat sink, and the laser emitter is disposed in a through channel of the heat sink.

In a preferred embodiment, the rotating assembly comprises a motor, a transmission gear, a light source rotating gear, and a laser rotating gear, and the motor is fixedly disposed in the housing and comprises an output shaft operatively coupled to the transmission gear. The transmission gear is operatively coupled to each of the light source rotating gear and the laser rotating gear, and the rotating optical sheet is operatively coupled to the light source rotating gear. The laser rotating gear comprises a hollow protruding column extending outward along an axis of the laser rotating gear, and the diffraction sheet is disposed on a distal end of the hollow protruding column. A laser beam emitted by the laser emitter is configured to pass through the hollow protruding column and the diffraction sheet so as to form a moving projection of stars.

In a preferred embodiment, the base seat comprises two supporting columns for supporting the hollow protruding column, and each of the two supporting columns comprises an arc groove matched with an outer wall of the hollow protruding column.

In a preferred embodiment, the control board comprises a wireless communication module configured to be connected to a remote controller.

In a preferred embodiment, the lens assembly is fastened between the upper housing and the lower housing.

In a preferred embodiment, the lens assembly comprises a lens lower lid, a lens upper lid, a plastic sheet, and a lens. The lens is fixedly disposed between the lens lower lid and the lens upper lid, and the plastic sheet is fixedly disposed on the lens upper lid in a hot melt manner.

In a preferred embodiment, the base seat comprises a plurality of slots for fixing the light source board and the fixed optical sheet.

Compared with the existing techniques, the technical solution has the following advantages.

1. The projection lamp in the present disclosure comprises the motor, and the motor drives the light source rotating gear and the laser rotating gear to rotate to enable the rotating optical sheet and the diffraction sheet to rotate in the housing so as to actually simulate rotating images of the nebula and the starry sky.

2. The projection lamp in the present disclosure comprises the laser assembly, and the laser assembly cooperates with the diffraction sheet to form the projection of stars. The light rays emitted by the light source board successively pass through the fixed optical sheet, the rotating optical sheet, and the lens assembly to be projected to form the projection of the nebula, so that the projection of the nebula has a stronger sense of reality. The projection of the nebula is better than a projection projected by a lamp with a piercing lampshade, and the projection of the nebula can move periodically, so that the projection of the nebula is more similar to a real nebula.

3. The projection lamp in the present disclosure has a smaller size, and when the projection lamp is placed on a desk or other supporting object, a projection direction of the projection lamp is easy to adjust, which has fewer limitations.

4. The projection lamp in the present disclosure can be remotely controlled by a remote controller, and the remote controller can separately control turning ON and OFF of the light source board and the laser emitter so as to project at least one of the projection of stars or the projection of the nebula.

DETAILED DESCRIPTION OF THE EMBODIMENTS

Figure 1:
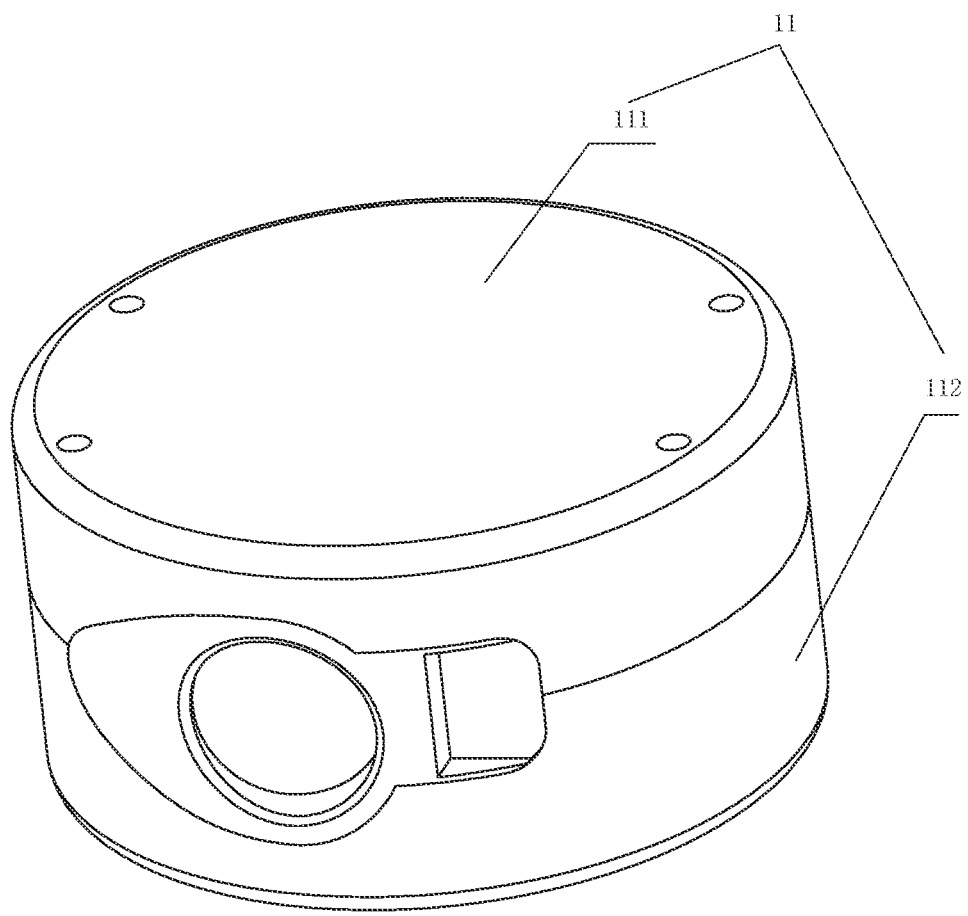
FIG. 1 illustrates a perspective view of a projection lamp of a preferred embodiment in the present disclosure.
Figure 2:
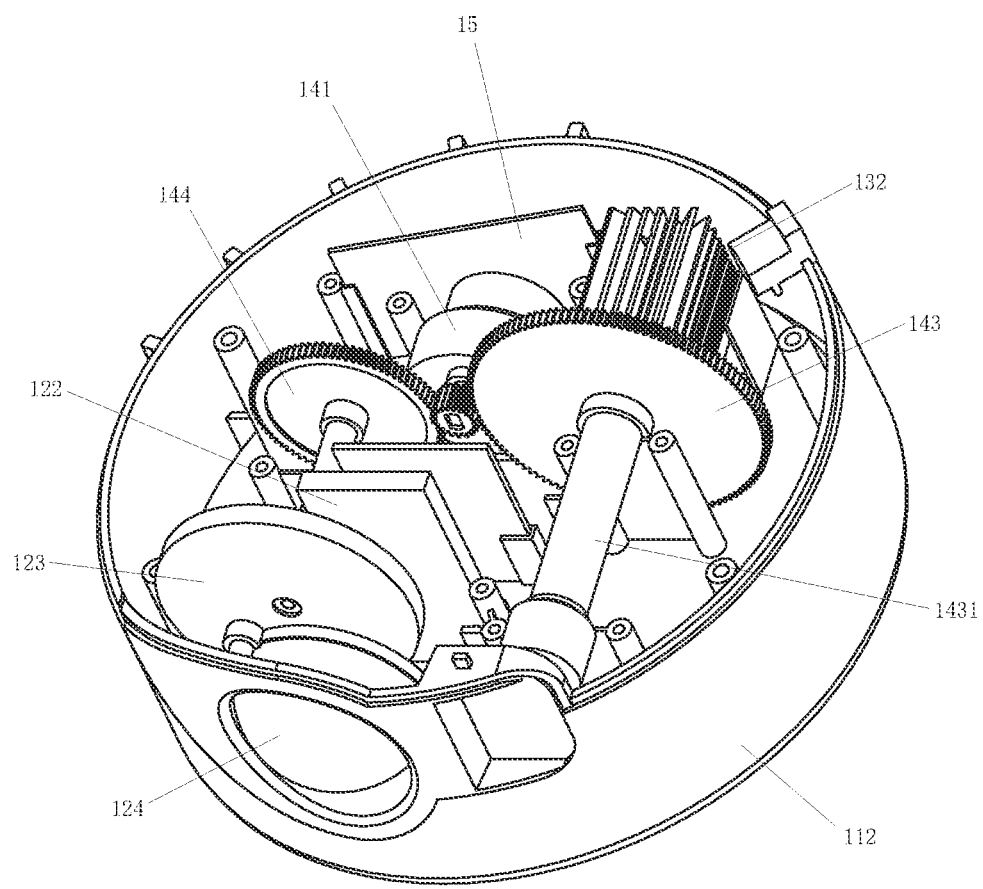
FIG. 2 illustrates a perspective view of the projection lamp with an upper housing removed of a preferred embodiment in the present disclosure.

The present disclosure will be further described below in combination with the accompanying drawings and embodiments.

The following will clearly and completely describe the technical solutions in the embodiments of the present disclosure with reference to the accompanying drawings. Obviously, the described embodiments are only a portion of the embodiments of the present disclosure, and not all of the embodiments. Based on the embodiments of the present disclosure, all other embodiments obtained by those of ordinary skill in the art without creative work fall within the protection scope of the present disclosure.

In the description of the present disclosure, it should be noted that the terms "upper", "lower", "inner", "outer", "top/bottom", etc. indicate the orientation or positional relationship based on the orientation shown in the drawings. The positional relationship is only for the convenience of describing the present disclosure and simplifying the description, rather than indicating or implying that the referenced device or element must have a specific orientation, be constructed, and be operated in a specific orientation. Therefore, the positional relationship should not be understood as a limitation of the present disclosure. In addition, the terms "first" and "second" are only used for descriptive purposes and should not be understood as indicating or implying relative importance.

In the description of the present disclosure, it should be noted that the terms "installed", "provided with", "sleeved/connected", "connected", etc., should be understood broadly. For example, "connected" can be a fixed connection, a detachable connection, or an integral connection, a mechanical connection, an electrical connection, a direct connection, or an indirect connection through an intermediate medium, and it can be a connection between two members. For those of ordinary skill in the art, the specific meaning of the above terms in the present disclosure can be understood under specific conditions.

Referring to FIGS. 1-7, a projection lamp for projecting a nebula and a starry sky in the present disclosure is provided and comprises a housing 11, a light source assembly 12, a laser assembly 13, a rotating assembly 14, a control board 15, a base seat 16, and a power source port 17.

The light source assembly 12 and the laser assembly 13 are disposed in the housing 11 and penetrate through the housing 11. The rotating assembly 14 and the control board 15 are disposed in the housing 11, and the rotating assembly 14 is configured to drive a rotating optical sheet 123 of the light source assembly 12 and a diffraction sheet 133 to rotate. The base seat 16 is fixedly disposed in the housing 11, and the light source assembly 12, the laser assembly 13, the rotating assembly 14, and the control board 15 are fixedly disposed on the base seat 16. The power source port 17 is disposed on the control board 15 and penetrates through the housing 11, and the power source port 17 is electrically connected to an external power source for supplying electric energy to the light source assembly 12, the laser assembly 13, the rotating assembly 14, and the control board 15.

The housing 11 comprises an upper housing 111 and a lower housing 112, and the upper housing 111 and the lower housing 112 are connected to each other to define a chamber in which the light source assembly 12, the laser assembly 13, the rotating assembly 14, and the control board 15 are disposed. The housing 11 further comprises a plurality of through holes 119 through which the light source assembly 12, the laser assembly 13, and the power source port 17 pass.

In this embodiment, the light source assembly 12 comprises a light source board 121, a light reflecting cup 125, a fixed optical sheet 122, the rotating optical sheet 123, and a lens assembly 124. The light source board 121 is fixedly disposed in the housing 11. The light reflecting cup 125 and the fixed optical sheet 122 are disposed in front of the light source board 121 and are fixedly disposed on the base seat 16. The rotating optical sheet 123 is disposed in front of the fixed optical sheet 122 and rotates with the rotating assembly 14. The lens assembly 124 is disposed in front of the rotating optical sheet 123 and is disposed on the housing 11. Light rays emitted by the light source board 121 successively pass through the fixed optical sheet 122, the rotating optical sheet 123, and the lens assembly 124 to be projected to form a projection of a nebula.

The lens assembly 124 comprises a lens lower lid 1241, a lens upper lid 1242, a plastic sheet 1243, and a lens 1244. The lens 1244 is fixedly disposed between the lens lower lid 1241 and the lens upper lid 1242. The plastic sheet 1243 is fixedly disposed on the lens upper lid 1242 in a hot melt manner.

The light source board 121 comprises a light emitting diode (LED) chip. The fixed optical sheet 122 and the rotating optical sheet 123 are frosted glass with rough surfaces. The light rays emitted by the light source board 121 are focused onto the fixed optical sheet 122 through the light reflecting cup 125 and successively pass through the fixed optical sheet 122 and the rotating optical sheet 123 to be scattered twice onto a projection plane to form the projection of the nebula. At the same time, the projection of the nebula rotates due to the rotating optical sheet 123 rotating with the rotating assembly 14.

In this embodiment, the laser assembly 13 comprises a laser emitter 131 and a heat sink 132, and the laser emitter 131 is disposed in a through channel 1321 of the heat sink 132. The diffraction sheet 133 is disposed in front of the laser emitter 131, and the diffraction sheet 133 is fixedly disposed on the rotating assembly 14 to rotate with the rotating assembly 14. A laser emitted by the laser emitter 131 passes through the diffraction sheet 133 to be projected to form a projection of stars, and the projection of stars rotates due to the diffraction sheet 133 rotating with rotating assembly 14.

Figure 3:
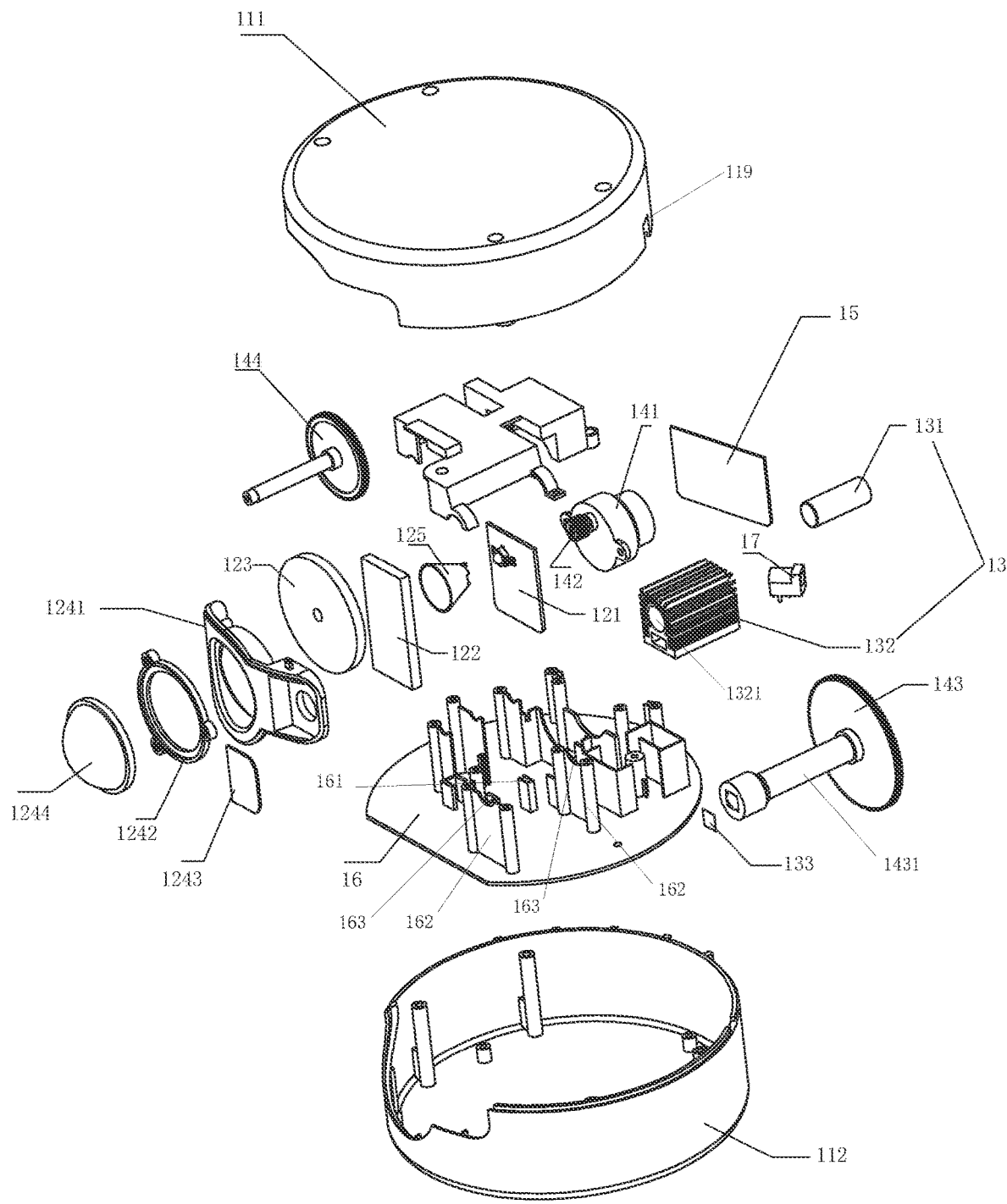
FIG. 3 illustrates an exploded view of the projection lamp of a preferred embodiment in the present disclosure.
Figure 4:
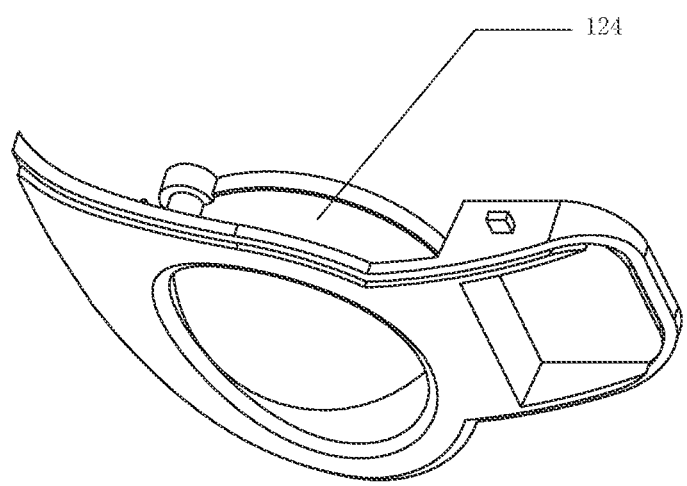
FIG. 4 illustrates a perspective view of a lens assembly of a preferred embodiment in the present disclosure.
Figure 5:
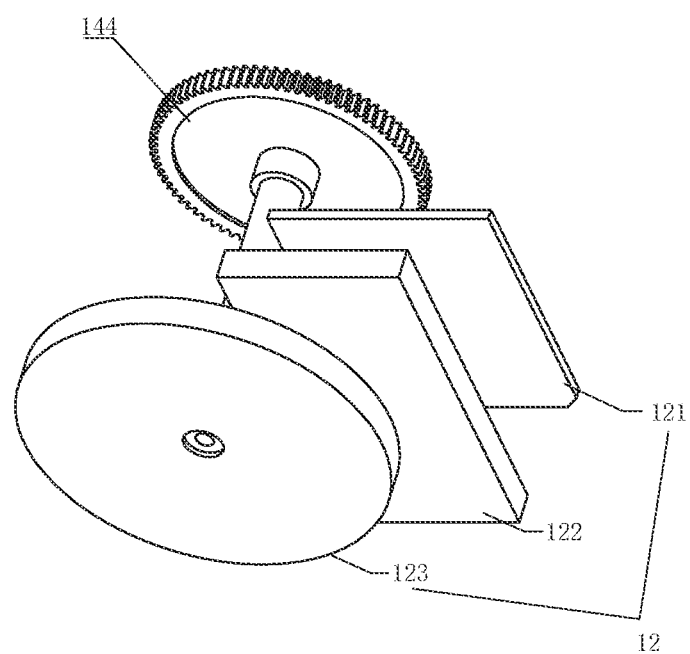
FIG. 5 illustrates a perspective view of a light source assembly of a preferred embodiment in the present disclosure.
Figure 6:
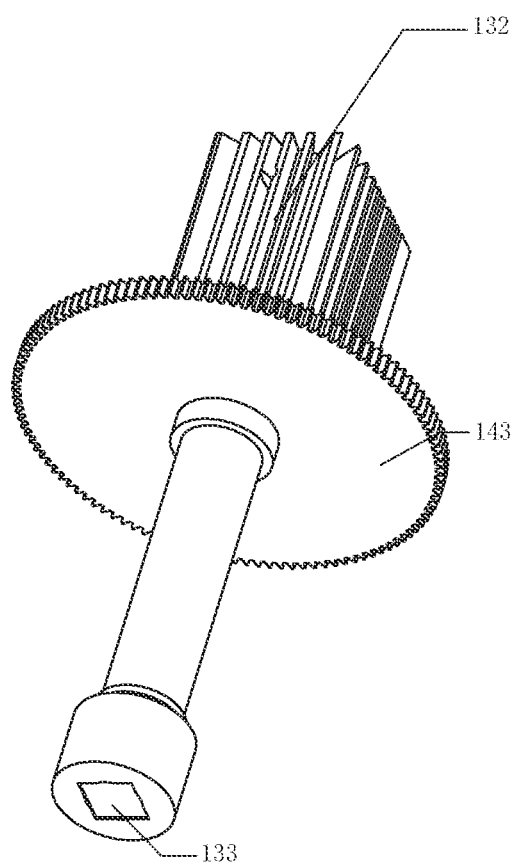
FIG. 6 illustrates a perspective view of a laser assembly of a preferred embodiment in the present disclosure.
Figure 7:
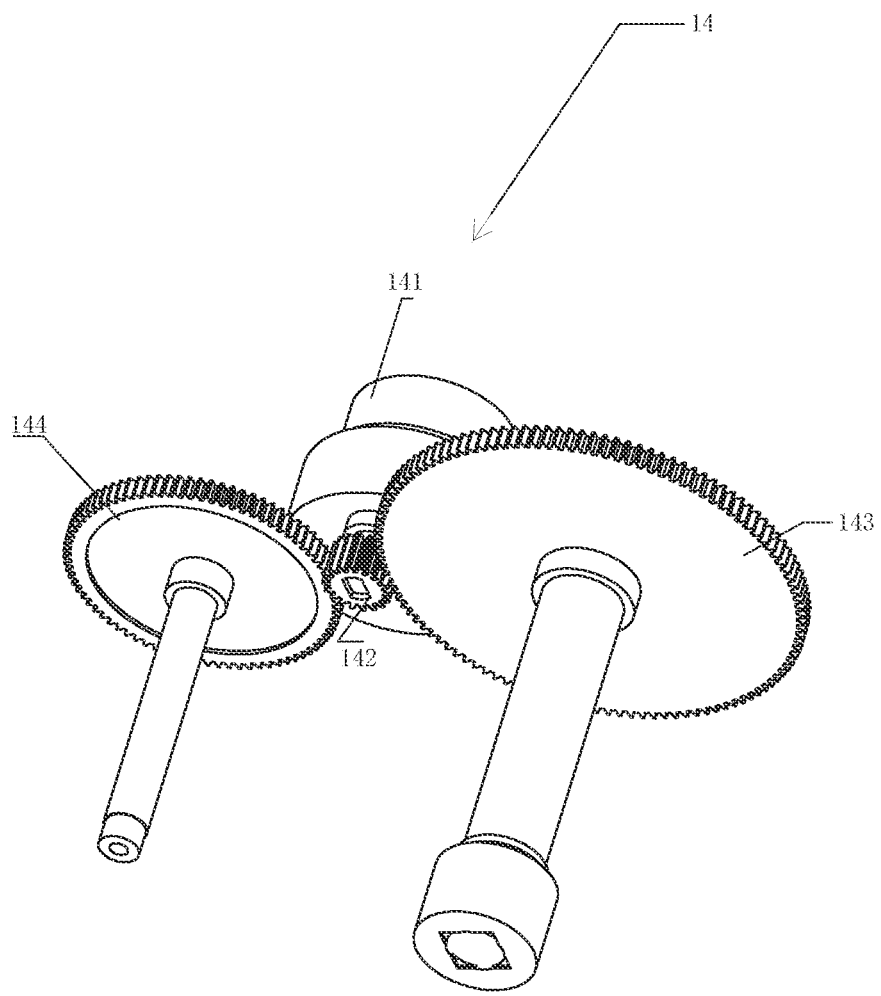
FIG. 7 illustrates a perspective view of a rotating assembly of a preferred embodiment in the present disclosure.

Referring to FIGS. 3-4, in this embodiment, the rotating assembly 14 comprises a motor 141, a transmission gear 142, a light source rotating gear 144, and a laser rotating gear 143. The motor 141 is fixedly disposed in the housing 11, and the motor 141 comprises an output shaft operatively coupled to the transmission gear 142. The transmission gear 142 is operatively coupled to each of the light source rotating gear 144 and the laser rotating gear 143. The rotating optical sheet 123 is operatively coupled to the light source rotating gear 144 to enable the rotating optical sheet 123 to rotate with the light source rotating gear 144. The laser rotating gear 143 comprises a hollow protruding column 1431 extending outward along an axis of the laser rotating gear 143, and the diffraction sheet 133 is disposed on a distal end of the hollow protruding column 1431 so as to enable the diffraction sheet 133 to rotate with the hollow protruding column 1431.

The control board 15 is electrically connected to each of the light source assembly 12, the laser assembly 13, the rotating assembly 14, and the power source port 17, and the technologies adopted are all existing technologies, and will not be repeated here. At the same time, the control board 15 comprises a wireless communication module configured to be connected to a remote controller. In this embodiment, the wireless communication module is an infrared remote control module.

In this embodiment, the base seat 16 comprises a plurality of slots 161 for fixing the light source board 121 and the fixed optical sheet 123. The base seat 16 comprises two supporting columns 162 for supporting the hollow protruding column 1431, and each of the two supporting columns 162 comprises an arc groove 163 matched with an outer wall of the hollow protruding column 1431.

The projection lamp in the present disclosure comprises the motor 141, and the motor 141 drives the light source rotating gear 144 and the laser rotating gear 143 to rotate to enable the rotating optical sheet 123 and the diffraction sheet 133 to rotate in the housing 11 so as to actually simulate rotating images of the nebula and the starry sky. The laser assembly cooperates with the diffraction sheet 133 to form the projection of stars, and the light rays emitted by the light source board 121 successively pass through the fixed optical sheet 122, the rotating optical sheet 123, and the lens assembly 124 to be projected to form the projection of the nebula, so that the projection of the nebula has a stronger sense of reality. The projection of the nebula is better than a projection projected by a lamp with a piercing lampshade, and the projection of the nebula can move periodically, so that the projection of the nebula is more similar to a real nebula. The projection lamp has a smaller size, and when the projection lamp is placed on a desk or other supporting object, a projection direction of the projection lamp is easy to adjust, which has fewer limitations. The projection lamp can be remotely controlled by a remote controller, and the remote controller can separately control turning ON and OFF of the light source board 121 and the laser emitter 131 so as to project at least one of the projection of stars or the projection of the nebula.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A projection lamp for projecting a nebula and a starry sky, comprising:
   a housing,
   a light source assembly,
   a laser assembly,
   a rotating assembly,
   a control board,
   a base seat, and
   a power source port, wherein:
      the light source assembly and the laser assembly are disposed in the housing and penetrate through the housing,
      the rotating assembly and the control board are disposed in the housing,
      the rotating assembly is configured to drive a rotating optical sheet of the light source assembly and a diffraction sheet to rotate,
      the base seat is fixedly disposed in the housing,
      the power source port is disposed on the control board and penetrates through the housing,
      the light source assembly comprises a light source board, a light reflecting cup, a fixed optical sheet, the rotating optical sheet, and a lens assembly,
      the light source board is fixedly disposed in the housing,
      the light source board, the light reflecting cup, the fixed optical sheet, the rotating optical sheet, and the lens assembly are successively disposed along a path in which light rays emitted by the light source board move,
      the fixed optical sheet is fixedly disposed on the base seat,
      the rotating optical sheet is rotatably connected to the rotating assembly,
      the lens assembly is fixedly disposed on the housing,
      the light reflecting cup is configured to reduce a lighting angle of the light rays emitted by the light source board so as to enable the light rays emitted by the light source board to be projected onto the fixed optical sheet,
      the fixed optical sheet and the rotating optical sheet are configured to successively scatter the light rays emitted by the light source board so as to enable the light rays scattered by the rotating optical sheet to be projected onto a projection plane to form a projection of the nebula through the lens assembly, and the rotating assembly is configured to drive the rotating optical sheet to rotate so as to make the projection of the nebula flow.

2. The projection lamp for projecting the nebula and the starry sky according to claim 1, wherein:

the housing comprises an upper housing and a lower housing, and the upper housing and the lower housing are connected to each other to define a chamber.

3. The projection lamp for projecting the nebula and the starry sky according to claim 1, wherein:

the fixed optical sheet and the rotating optical sheet are frosted glass.

4. The projection lamp for projecting the nebula and the starry sky according to claim 1, wherein:

the laser assembly comprises a laser emitter and a heat sink, and the laser emitter is disposed in a through channel of the heat sink.

5. The projection lamp for projecting the nebula and the starry sky according to claim 4, wherein:

the rotating assembly comprises a motor, a transmission gear, a light source rotating gear, and a laser rotating gear, the motor is fixedly disposed in the housing and comprises an output shaft operatively coupled to the transmission gear, the transmission gear is operatively coupled to each of the light source rotating gear and the laser rotating gear, the rotating optical sheet is operatively coupled to the light source rotating gear, the laser rotating gear comprises a hollow protruding column extending outward along an axis of the laser rotating gear, the diffraction sheet is disposed on a distal end of the hollow protruding column, and a laser beam emitted by the laser emitter is configured to pass through the hollow protruding column and the diffraction sheet so as to form a moving projection of stars.

6. The projection lamp for projecting the nebula and the starry sky according to claim 5, wherein:

the base seat comprises two supporting columns for supporting the hollow protruding column, and each of the two supporting columns comprises an arc groove matched with an outer wall of the hollow protruding column.

7. The projection lamp for projecting the nebula and the starry sky according to claim 1, wherein:

the control board comprises a wireless communication module configured to be connected to a remote controller.

8. The projection lamp for projecting the nebula and the starry sky according to claim 2, wherein:

the lens assembly is fastened between the upper housing and the lower housing.

9. The projection lamp for projecting the nebula and the starry sky according to claim 8, wherein:

the lens assembly comprises a lens lower lid, a lens upper lid, a plastic sheet, and a lens, the lens is fixedly disposed between the lens lower lid and the lens upper lid, and the plastic sheet is fixedly disposed on the lens upper lid in a hot melt manner.

10. The projection lamp for projecting the nebula and the starry sky according to claim 1, wherein:

the base seat comprises a plurality of slots for fixing the light source board and the fixed optical sheet.

* * * * *